Sept. 23, 1930.    W. J. KRAUSE    1,776,767
WINDING FOR ELECTRIC MACHINES
Filed June 26, 1924    2 Sheets-Sheet 1

Inventor
Walter J. Krause
By Hull, Birch & West
Attys

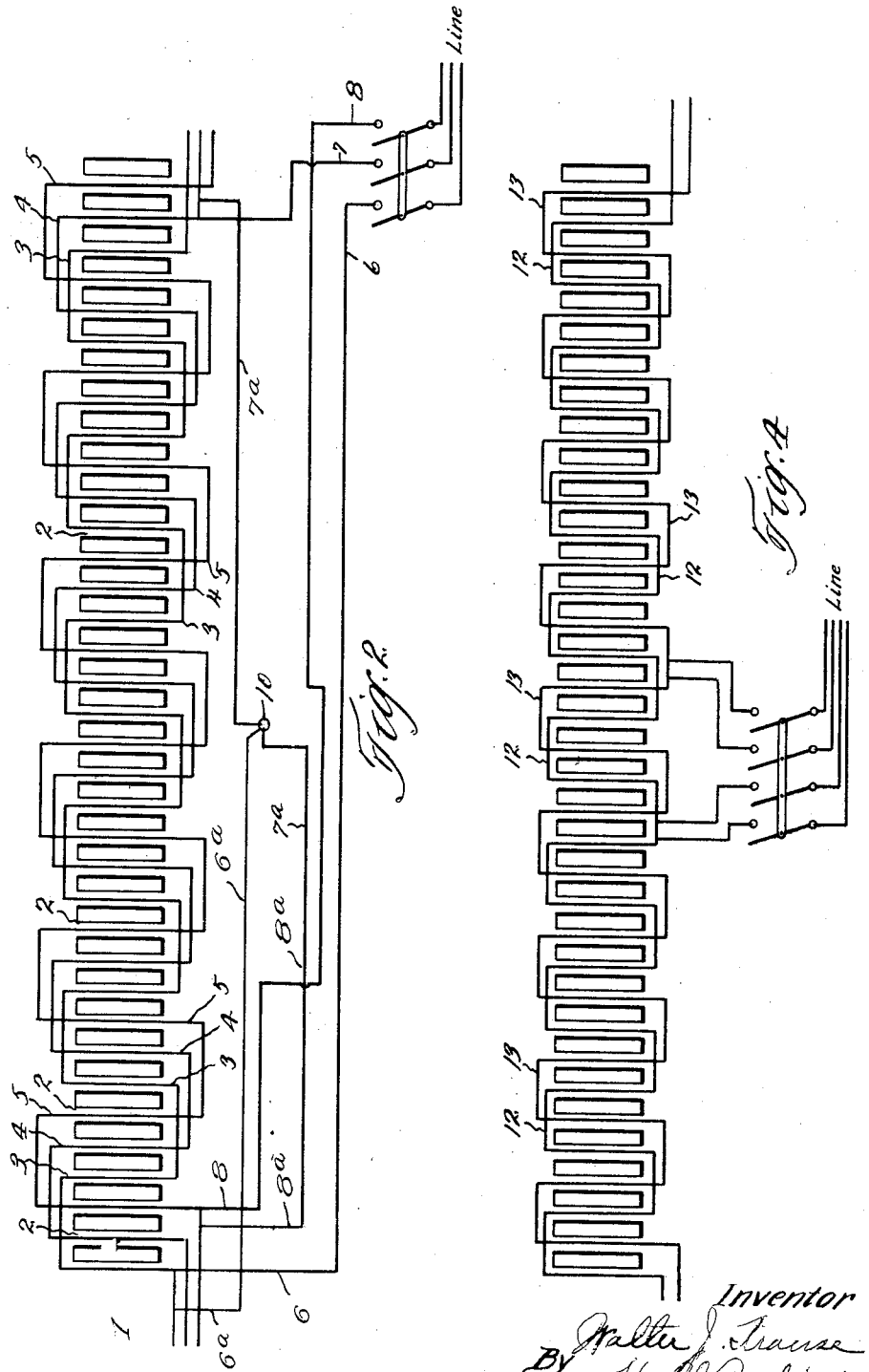

Patented Sept. 23, 1930

1,776,767

UNITED STATES PATENT OFFICE

WALTER J. KRAUSE, OF CLEVELAND, OHIO, ASSIGNOR TO THE OHIO ELECTRIC & CONTROLLER COMPANY, OF CLEVELAND, OHIO, A CORPORATION OF OHIO

WINDING FOR ELECTRIC MACHINES

Application filed June 26, 1924. Serial No. 722,457.

This invention relates to new and useful improvements in windings for electrical machines and has particular reference to a simplified and improved form of winding for a torque motor whose function it is to rotate a portion of a revolution or one or more revolutions, then stop and exert a constant pull.

Motors of this general type are useful particularly in connection with switchboards having contacts which are opened and closed under power, as for example, the opening and closing of a series of contacts which progressively cut out resistance for the starting of an elevator motor. In this instance the motor is adapted to rotate a predetermined distance to progressively close suitable contacts which cut out resistance in the elevator motor circuit, and hold such contacts closed as long as the elevator is moving. When the elevator is stopped, the motor releases the contacts which then open, and hence open the elevator motor circuit.

It is the primary object of the present invention to provide a simplified form of winding for a motor of this general character wherein a maximum number of poles will be obtained with a given number of slots, thereby obtaining a relatively high torque.

Another object is to provide a winding for a motor which shall be easy to apply and which shall require a minimum number of internal connections.

A still further object is to provide a winding of the aforesaid character which shall be equally well adapted to two phase or three phase motors and especially those which employ a squirrel cage rotor and a rotating field thereby providing a particularly inexpensive and easily manufactured product.

With these and other objects in view the invention may be stated to consist broadly in the winding of two or more skeins and then arranging these skeins in the stator or rotor slots in alternate relationship so as to provide a maximum number of poles.

Figure 1:
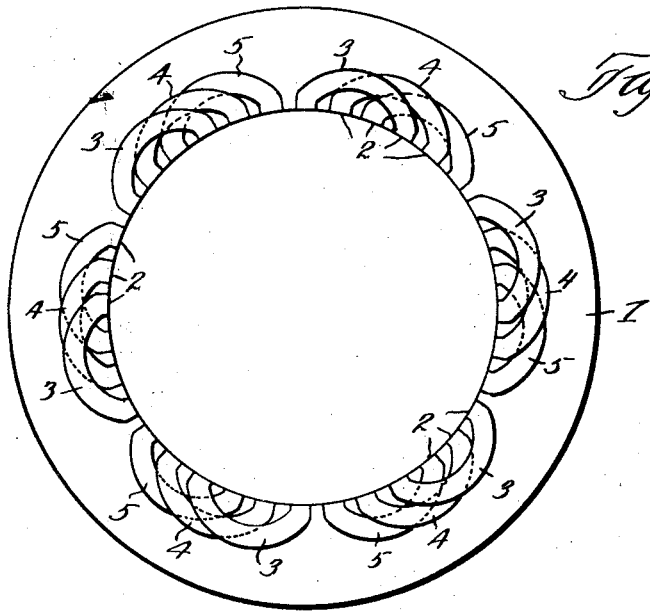

In the accompanying drawings, Fig. 1 is an end elevation of a stator of a three phase motor wound with my improved form of winding; Fig. 2 is a diagram showing the winding in place on the developed surface of the stator; and Figs. 3 and 4 are views similar to Figs. 1 and 2 respectively but showing my improved winding applied to a two phase motor.

Figure 3:
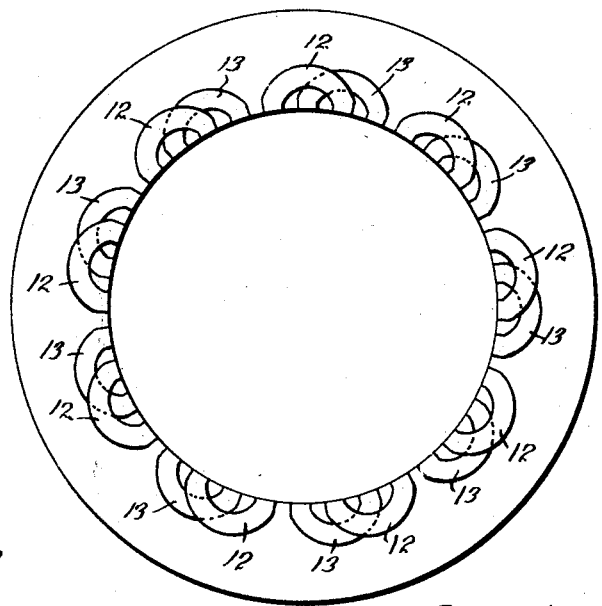

Describing the various parts by reference characters and referring particularly to Figs. 1 and 3, 1 denotes a stator of a three phase motor which is provided with a plurality of slots 2 for the reception of the stator winding. In the present instance I have shown the stator provided with thirty-six slots and with my improved winding it is possible to obtain twelve poles. In winding a motor of this character, I provide three skein windings designated 3, 4 and 5. Each skein consists of a number of turns of wire each insulated from the other and the whole suitably insulated by empire cloth, varnish or other suitable insulation. The ends of skein 3 are designated 6 and $6^a$ and the ends of skeins 4 and 5 are designated 7, $7^a$ and 8, $8^a$ respectively. I first apply skein 3 to a slot 2 in the stator, which for convenience I shall term the first slot, then bend said skein across the end of the stator and insert it into the fourth slot, then bend said skein across the opposite end of the stator and insert it in the seventh slot and continue in this manner so that skein 3 is positioned in every fourth slot, or in other words, so that there will be two slots spacing between turns of this skein. I next apply skein 4 in the second slot 2, or directly next to skein 3. Skein 4 is then wound in a similar manner occupying the second, fifth, eighth slots and so on. Skein 5 is next placed in position in an identical manner but occupies the third, sixth, ninth and twelfth slots and so on. It will thus be evident that each skein is positioned within its respective slots so as to define a serpentine form. The end 6 of skein 3 is connected to a phase of the line while the opposite end $6^a$ of this skein is connected to what I shall term a neutral point indicated at 10. The end $7^a$ of skein 4 is connected to the neutral point while the opposite end 7 is connected to a phase of the line. The end 8 of skein 5 is connected to the remaining phase of the line and the opposite end $8^a$ is connected to the neutral point 10. It will be seen that when current in skein 3 is a maximum and flowing in a direction from the neutral point to the end 6, then the first pole group, consisting of three individual poles, will have a north polarity while the second pole group will have a south polarity and so on; the odd numbered pole groups having north polarities while even numbered pole groups have south polarities. A third of a period later the current in skein 5 will be a maximum in the same direction and the first two poles will be south poles, the next three north poles, the next three south poles, and so on leaving the last pole a south pole which in reality is a portion of the first pole group. Then after another one-third of a period current in skein 4 will have reached its maximum and the poles will have shifted so that the first is a north pole, the next three south poles, the next three north poles and so on leaving the last two poles as north poles for this particular period and these two north poles together with the first north pole form a pole group. There is thus produced a steady movement of the poles around the stator.

With a three phase stator wound as shown and described, there will always be one third as many poles as there are stator slots, and in the present instance wherein the stator is provided with thirty-six slots, there will be twelve poles formed when the skeins are energized.

In the case of a two phase motor as shown in Figs. 3 and 4, I use only two skeins designated 12 and 13. Skein 12 is positioned in the first slot and in every other slot thereafter while skein 13 is placed in the slots intermediate those occupied by skein 12. The ends of each of the skeins are brought out for suitable connection to the line. Due to the arrangement of this winding and the current flow therethrough, there will be one half as many poles as there are stator slots, or in the present instance wherein thirty-six slots are used, there will be eighteen poles. In a two phase motor, wound as shown and described, no soldered internal connections are necessary and hence a material saving in time is obtained.

While I have shown and described my winding as applied to the stator, it may be applied equally well to an armature.

Having thus described my invention, what I claim is:

1. In a torque motor whose function is to rotate a portion of a revolution or one or more revolutions, then stop and exert a constant pull, a stator provided with a plurality of slots adapted to receive a winding, said windings comprising three independent skeins, each skein consisting of a number of turns of wire each insulated from the other, the starting end of one of said skeins being connected to the finishing end of the other two skeins, said skeins being positioned within said slots successively in wave form in such a manner that there will be two slots spacing between windings of any one skein.

2. In a torque motor having a rotating magnetic field magnet, a combination of a stator provided with thirty-six slots adapted to receive a winding, three skeins of wire positioned within said slots, each skein comprising a number of turns and being wound through its respective series of slots to define a wave form, said skeins being positioned within said slots successively in such a manner that there will be two slots spacing between windings of any one skein, each skein comprising a single piece of wire having one end connected to a neutral point in electrical circuit and the opposite end adapted to be connected to a source of three phase alternating current.

3. The method of winding an alternating current electric machine which consists in, winding the entire conductor for each phase into a single coil of a plurality of turns, inserting one side of the coil in a winding slot, bending the coil across the end of the winding core and inserting it into a slot removed from the first slot by a number equal to the number of phases of the supply, bending the coil across the opposite end of the core and inserting it in a slot removed from the first slot by twice the number of phases of the supply, and continuing the operation until the whole of the coil is inserted into slots in wave form.

4. The method of winding a polyphase electric machine which consists in, winding the entire conductor for each phase into a single coil of a plurality of turns, inserting one coil in equi-spaced slots in wave form about the entire winding surface, inserting the other coils in like manner in separate equi-spaced slots intermediate the slots of the first winding.

5. In an alternating current electric machine, a core having a cylindrical winding surface provided with a plurality of winding slots, a phase winding arranged in certain of said slots comprising a taped conductor skein formed of a plurality of loops of insulated wire and arranged in said slots in wave form.

In testimony whereof, I hereunto affix my signature.

WALTER J. KRAUSE.